United States Patent
Ohno et al.

(10) Patent No.: US 10,139,583 B2
(45) Date of Patent: Nov. 27, 2018

(54) OPTICAL FIBER CABLE

(71) Applicant: FUJIKURA LTD., Tokyo (JP)

(72) Inventors: Masatoshi Ohno, Sakura (JP); Daiki Takeda, Tokyo (JP); Ken Osato, Sakura (JP)

(73) Assignee: FUJIKURA LTD., Tokyo (JP)

(*) Notice: Subject to any disclaimer, the term of this patent is extended or adjusted under 35 U.S.C. 154(b) by 0 days.

(21) Appl. No.: 15/567,793

(22) PCT Filed: Sep. 2, 2016

(86) PCT No.: PCT/JP2016/075818
§ 371 (c)(1),
(2) Date: Oct. 19, 2017

(87) PCT Pub. No.: WO2017/061196
PCT Pub. Date: Apr. 13, 2017

(65) Prior Publication Data
US 2018/0106977 A1    Apr. 19, 2018

(30) Foreign Application Priority Data

Oct. 9, 2015    (JP) ................... 2015-201276

(51) Int. Cl.
*G02B 6/44*    (2006.01)

(52) U.S. Cl.
CPC ............ *G02B 6/4495* (2013.01); *G02B 6/44* (2013.01); *G02B 6/4433* (2013.01); *G02B 6/4435* (2013.01)

(58) Field of Classification Search
None
See application file for complete search history.

(56) References Cited

U.S. PATENT DOCUMENTS 5,469,523 A * 11/1995 Blew .................... G02B 6/4403
                                                                385/101
5,611,016 A    3/1997 Fangmann et al.
(Continued)

FOREIGN PATENT DOCUMENTS

JP    S62-109122 U    7/1987
JP    H03-020704 A    1/1991
(Continued)

OTHER PUBLICATIONS

Office Action in corresponding Japanese Patent Application 2015-201276 dated Sep. 6, 2016 (3 pages).
(Continued)

*Primary Examiner* — Tina M Wong
(74) *Attorney, Agent, or Firm* — Osha Liang LLP

(57) ABSTRACT

An optical fiber cable includes: a cable main body including a core that includes optical fibers, at least a pair of tension members that face each other with the core interposed therebetween, and an inner sheath that covers the core and the tension members; a cylindrical outer sheath that accommodates the cable main body; a reinforcing sheet provided between the cable main body and the outer sheath; and a rip cord provided between the reinforcing sheet and the cable main body. The reinforcing sheet surrounds an entire circumference of the cable main body, the reinforcing sheet includes an overlapping portion in which portions of the reinforcing sheet overlap each other in a portion in a circumferential direction of the cable main body, and the reinforcing sheet is formed of a metal.

10 Claims, 5 Drawing Sheets

(56) References Cited

U.S. PATENT DOCUMENTS

| | | | |
|---|---|---|---|
| 6,192,178 B1 | 2/2001 | Logan et al. | |
| 6,957,000 B2 * | 10/2005 | McAlpine | G02B 6/4495 385/102 |
| 7,197,215 B2 * | 3/2007 | Baird | G02B 6/4433 385/100 |
| 8,798,418 B2 * | 8/2014 | Davies | G02B 6/4495 385/100 |
| 8,913,862 B1 | 12/2014 | Emmerich et al. | |
| 9,261,664 B2 * | 2/2016 | Tomikawa | G02B 6/443 |
| 9,482,839 B2 * | 11/2016 | Sandate Aguilar | G02B 6/441 |
| 9,529,170 B2 * | 12/2016 | Sutehall | G02B 6/4433 |
| 9,927,588 B2 * | 3/2018 | Blazer | G02B 6/443 |
| 2002/0044751 A1 * | 4/2002 | Logan | G02B 6/4433 385/113 |
| 2009/0317039 A1 * | 12/2009 | Blazer | G02B 6/443 385/107 |
| 2014/0161395 A1 | 6/2014 | Klavuhn et al. | |
| 2014/0241677 A1 * | 8/2014 | Sutehall | G02B 6/4433 385/104 |

FOREIGN PATENT DOCUMENTS

| | | |
|---|---|---|
| JP | H06-174985 A | 6/1994 |
| JP | H06-73816 U | 10/1994 |
| JP | H10-062639 A | 3/1998 |
| JP | 2000-310729 A | 11/2000 |
| JP | 2003-322782 A | 11/2003 |
| JP | 2007-249020 A | 9/2007 |
| JP | 2010-266501 A | 11/2010 |
| JP | 2013-228567 A | 11/2013 |

OTHER PUBLICATIONS

Office Action in corresponding Japanese Patent Application 2015-201276 dated Feb. 7, 2017 (4 pages).

Notice of Allowance in corresponding Japanese Patent Application 2015-201276 dated Apr. 4, 2017 (3 pages).

Office Action Issued in corresponding Canadian Patent Application No. 2,982,725 dated Aug. 1, 2018 (4 pages).

* cited by examiner

OPTICAL FIBER CABLE

TECHNICAL FIELD

The present invention relates to an optical fiber cable.

Priority is claimed on Japanese Patent Application No. 2015-201276, filed on Oct. 9, 2015, the content of which is incorporated herein by reference.

BACKGROUND ART

With an increase in the use of optical fiber cables, there have been cases where optical fibers within the optical fiber cable are damaged due to the cable being bitten by an animal, such as a rat or a squirrel. In response, measures such as the provision of a protection structure, for example, a metal tape, which surrounds optical fibers have been taken (for example, see Patent Document 1 and Patent Document 2).

PATENT DOCUMENTS

[Patent Document 1] Japanese Unexamined Patent Application, First Publication No. H6-174985
[Patent Document 2] Japanese Unexamined Patent Application, First Publication No. 2013-228567

SUMMARY

However, in the optical fiber cable, there has been a difficulty in cutting off an outer sheath due to the protection structure in an operation of cutting off the outer sheath by a rip cord and taking out the optical fibers.

One or more embodiments of the present invention provide an optical fiber cable which is capable of preventing optical fibers from being damaged due to animals' bites and has an excellent workability in an operation of taking out the optical fibers.

An optical fiber cable according one or more embodiments of the present invention includes a cable main body including a core including optical fibers, at least a pair of tension members disposed so as to face each other with the core interposed therebetween, and an inner sheath covering the core and the tension members, a cylindrical outer sheath accommodating the cable main body, a reinforcing sheet provided between the cable main body and the outer sheath, the reinforcing sheet surrounding an entire circumference of the cable main body, the reinforcing sheet having an overlapping portion in which portions of the reinforcing sheet overlap each other in a portion in a circumferential direction of the cable main body, the reinforcing sheet being formed of a metal, and a rip cord provided between the reinforcing sheet and the cable main body. The overlapping portion of the reinforcing sheet and the rip cord are provided at different positions in the circumferential direction of the cable main body.

According to one or more embodiments, a side edge of the reinforcing sheet disposed on an outer circumference in the overlapping portion of the reinforcing sheet and the tension members may be provided at different positions in the circumferential direction of the cable main body.

According to one or more embodiments, the overlapping portion of the reinforcing sheet and the tension members may be provided at different positions in the circumferential direction of the cable main body.

According to one or more embodiments, one of the tension members may be disposed within a region surrounded by a first virtual line passing through a center of the cable main body and a center of the rip cord and a second virtual line which is inclined at 30° or less with respect to the first virtual line and extends toward an outside in a radial direction, in the cable main body.

According to one or more embodiments, the optical fiber cable may further include at least a pair of rip cords, in which an angle between a third virtual line passing through a center of the cable main body and a center of a first rip cord in the pair of rip cords and a fourth virtual line passing through the center of the cable main body and a center of a second rip cord in the pair of rip cords may be 120° or more.

According to one or more embodiments, a difference between an outer diameter of the cable main body and an inner diameter of the reinforcing sheet may be smaller than twice an outer diameter of the rip cord.

According to one or more embodiments, a pull-out force of the rip cord may be 2.94 N or more.

According to one or more embodiments, the outer sheath may be formed to have a corrugated shape.

According to one or more embodiments, the positions of a rip cord and an overlapping portion of a reinforcing sheet in a cable circumferential direction are different from each other, and thus the rip cord is disposed at a location where the reinforcing sheet is configured as a single layer. For this reason, it is possible to reliably cut off the reinforcing sheet by the rip cord. Accordingly, the workability of an operation of taking out the optical fibers is improved because of intermediate post-branching or the like.

According to one or more embodiments, the reinforcing sheet surrounding the cable main body is provided, and thus it is possible to prevent the optical fibers from being damaged due to feeding damage caused by animals.

DETAILED DESCRIPTION

Hereinafter, one or more embodiments of the present invention will be described with reference to the accompanying drawings.

Figure 1:
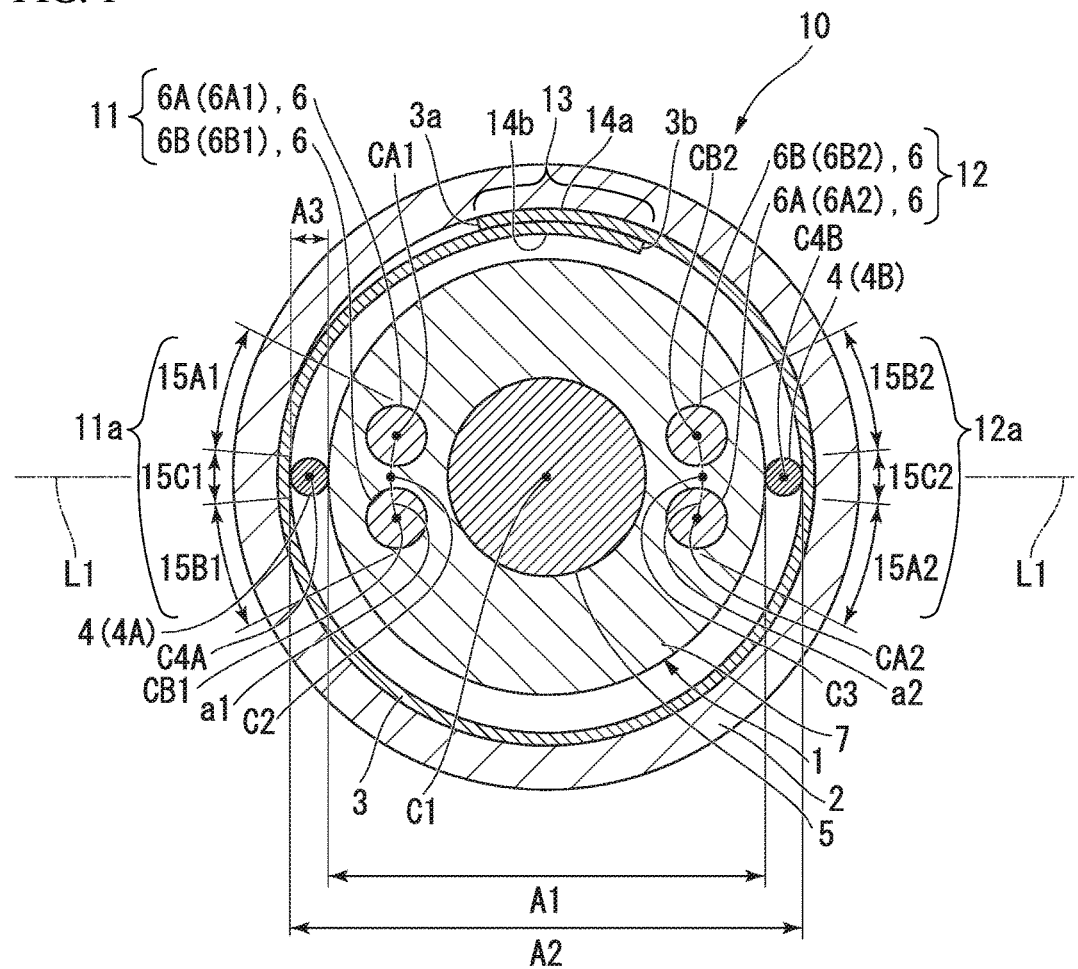
FIG. 1 is a cross-sectional view showing an optical fiber cable according to a first example of one or more embodiments of the present invention.
Figure 2:
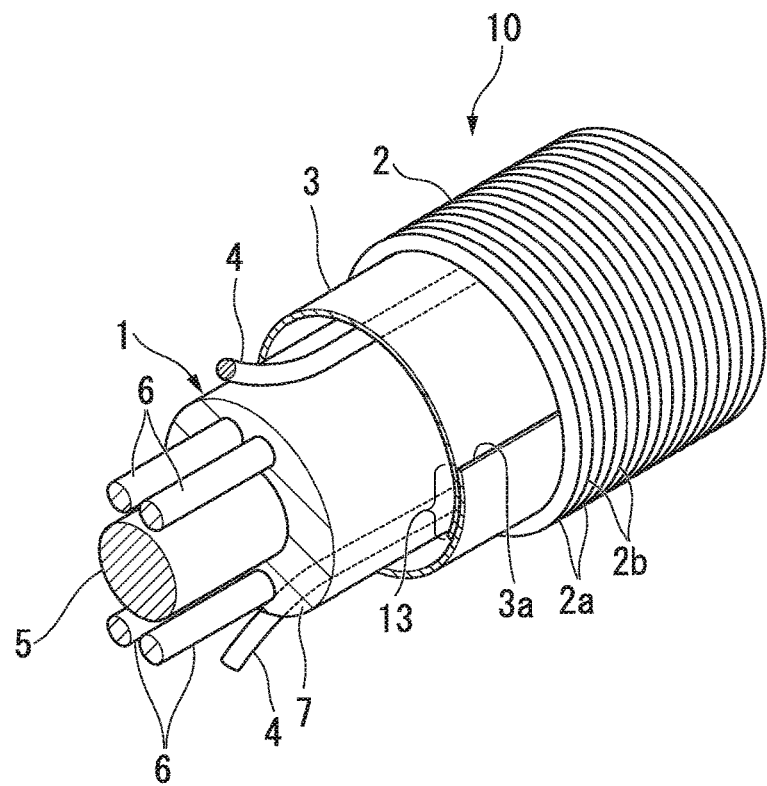
FIG. 2 is a perspective view showing a structure of the optical fiber cable shown in FIG. 1.
Figure 3:
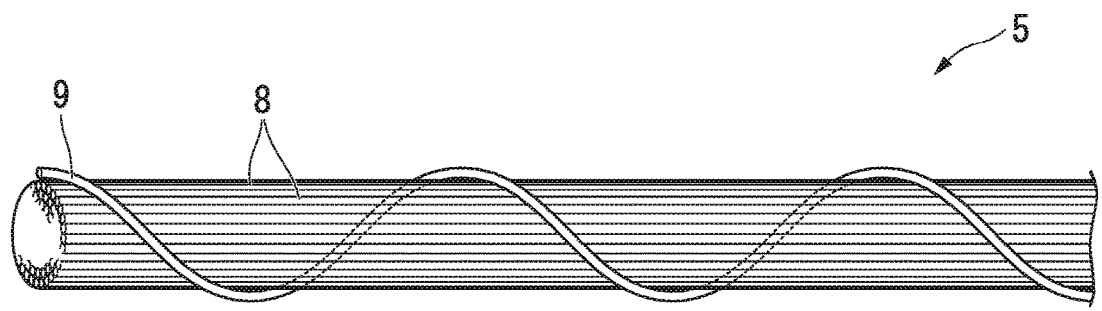
FIG. 3 is a perspective view showing an example of a core used for the optical fiber cable shown in FIG. 1.

FIG. 1 is a cross-sectional view showing an optical fiber cable 10 according to a first example of one or more embodiments of the present invention. FIG. 1 is a cross-sectional view perpendicular to the longitudinal direction of the optical fiber cable 10. FIG. 2 is a perspective view showing the structure of the optical fiber cable 10. FIG. 3 is a perspective view showing an example of a core 5 which is used for the optical fiber cable 10.

Note that the longitudinal direction of the optical fiber cable 10 may be referred to as a "cable longitudinal direction".

In FIG. 1, the cable longitudinal direction is a direction perpendicular to a paper surface. In addition, the circumferential direction (circumferential direction in a surface perpendicular to the cable longitudinal direction) of the cable main body 1 may be referred to as a "cable circumferential direction".

As shown in FIG. 1, the optical fiber cable 10 includes a cable main body 1, an outer sheath 2, a reinforcing sheet 3, and a pair of rip cords 4 (tear strings).

The cable main body 1 includes a core 5, a tension member 6, and an inner sheath 7.

As shown in FIG. 3, the core 5 is constituted by assembling a plurality of optical fibers 8. The plurality of optical fibers 8 constituting the core 5 are, for example, bundled, and can be configured to be wound by a binding material 9 (identification thread).

As shown in FIG. 1, the cross-sectional shape of the core 5 is a circular shape. The cross-sectional shape of the core 5 does not need to be a complete circular shape, or may be an elliptical shape. The optical fiber 8 is an optical fiber core wire, and may be an optical fiber strand, an optical fiber tape core wire, or the like.

Note that the core 5 may be constituted by assembling a plurality of units each including the plurality of optical fibers 8.

The tension member 6 is constituted by, for example, a metal wire (a steel wire or the like), a tension fiber (aramid fibers or the like), FRP, or the like.

Regarding the tension member 6, at least a pair of tension members is provided so as to interpose the core 5. In the optical fiber cable 10 shown in FIG. 1, the cable main body 1 includes a first pair of tension members 6A and 6A that are disposed at positions rotationally symmetrical to each other about a center axis C1 of the cable main body 1, and a second pair of tension members 6B and 6B that are disposed at positions rotationally symmetrical to each other about the center axis C1 of the cable main body 1.

One tension member 6A1 of the first pair of tension members 6A and 6A and one tension member 6B1 of the second pair of tension members 6B and 6B are close to each other. Similarly, the other tension member 6A2 of the first pair of tension members and the other tension member 6B2 of the second pair of tension members are close to each other.

In one or more embodiments, the tension members 6A1 and 6B1 have the same mechanical characteristics (for example, flexural rigidity). Similarly, the tension members 6A2 and 6B2 have the same mechanical characteristics (for example, flexural rigidity).

In addition, in one or more embodiments, the tension members 6A and 6A have the same mechanical characteristics (for example, flexural rigidity) and the tension members 6B and 6B have the same mechanical characteristics (for example, flexural rigidity).

Since the tension member 6A1 and the tension member 6B1 are close to each other, the tension member 6A1 and the tension member 6B1 are regarded as one tension member and are referred to as a first tension member 11. Similarly, the tension member 6A2 and the tension member 6B2 are regarded as one tension member and are referred to as a second tension member 12.

The first tension member 11 and the second tension member 12 are disposed so as to face each other with the core 5 interposed therebetween.

A difference in position in the cable circumferential direction between a center axis CA1 of the tension member 6A1 and a center axis CB1 of the tension member 6B1 can be an angle of, for example, 20° or less. In other words, an angle between a virtual line passing through the center of the cable main body 1 and the center of the tension member 6A1 and a virtual line passing through the center of the cable main body 1 and the center of the tension member 6B1 can be 20° or less.

Similarly, a difference in position in the cable circumferential direction between a center axis CA2 of the tension member 6A2 and a center axis CB2 of the tension member 6B2 can be an angle of, for example, 20° or less. In other words, an angle between a virtual line passing through the center of the cable main body 1 and the center of the tension member 6A2 and a virtual line passing through the center of the cable main body 1 and the center of the tension member 6B2 can be 20° or less.

The center of an arc a1 connecting the center axis CA1 of the tension member 6A1 and the center axis CB1 of the tension member 6B1 is referred to as C2, and the center of an arc a2 connecting the center axis CA2 of the tension member 6A2 and the center axis CB2 of the tension member 6B2 is referred to as C3.

A straight line passing through the center C2 and the center C3 is referred to as a neutral line L1. Note that the arcs a1 and a2 are arcs having the center axis C1 as the center thereof.

The neutral line L1 may be parallel to a straight line connecting the center axes CA1 and CB2 of the tension members 6A1 and 6B2 and a straight line connecting the center axes CB1 and CA2 of the tension members 6B1 and 6A2.

In a cross-section (see FIG. 1) which is perpendicular to the longitudinal direction of the cable main body 1, a direction (vertical direction in FIG. 1) which is perpendicular to the neutral line L1 is a direction in which the expansion and contraction of the tension member 6 are reduced during the bending of the cable main body 1, as compared to another direction, and thus it is relatively easy to bend the cable main body 1 in this direction.

The inner sheath 7 collectively covers the core 5 and the tension member 6. As a material of the inner sheath 7, a resin such as polyethylene (PE) or polyvinyl chloride (PVC) can be used.

The reinforcing sheet 3 is formed of a metal such as stainless steel, copper, or a copper alloy. In particular, stainless steel is used. The reinforcing sheet 3 has, for example, a tape shape, and is provided such that the longitudinal direction thereof is consistent with the longitudinal direction of the cable main body 1.

The thickness of the reinforcing sheet 3 can be, for example, 0.1 to 0.3 mm. The thickness of the reinforcing sheet 3 is in a range from 0.1 to 0.3 mm, and thus it is possible to prevent the optical fibers 8 from being damaged due to feeding damage caused by animals and to easily perform an operation of cutting off the reinforcing sheet 3 by the rip cord 4.

The reinforcing sheet 3 surrounds the entire circumference of the cable main body 1, and has portions overlapping each other in a portion in the cable circumferential direction. The portions overlapping each other of the reinforcing sheet 3 are referred to as an overlapping portion 13.

The overlapping portion 13 is a portion where a side region (first side region) 14a including one side edge (first side edge) 3a of the reinforcing sheet 3 and a side region (second side region) 14b including the other side edge (second side edge) 3b overlap each other. In one or more embodiments, the side region 14a and the side region 14b are bounded to each other by using an adhesive or the like.

In one or more embodiments, the overlapping portion 13 has a constant width along the longitudinal direction of the reinforcing sheet 3.

In one or more embodiments, the position of the overlapping portion 13 in the cable circumferential direction is constant in the cable longitudinal direction.

In one or more embodiments, the side edge (side edge in the outer circumference) 3a of the reinforcing sheet 3 (side region 14a) on the outer circumference side in the overlapping portion 13 and the tension member 6 differ from each other in the position in the cable circumferential direction.

A difference in the position in the cable circumferential direction between the side edge 3a of the reinforcing sheet 3 and the tension member 6 refers to a difference between the position of the side edge 3a of the reinforcing sheet 3 in the cable circumferential direction and the positions of a formation region (first formation region) 11a of the first tension member 11 and a formation region (second formation region) 12a of the second tension member 12 in the cable circumferential direction.

The formation region 11a of the first tension member 11 is constituted by formation ranges 15A1 and 15B1 of the tension members 6A1 and 6B1 and an intermediate range 15C1 corresponding to a region between the tension member 6A1 and the tension member 6B1. The formation region 12a of the second tension member 12 is constituted by formation ranges 15A2 and 15B2 of the tension members 6A2 and 6B2 and an intermediate range 15C2 corresponding to a region between the tension member 6A2 and the tension member 6B2.

As described above, it is relatively easy to bend the cable main body 1 in a direction (vertical direction in FIG. 1) which is perpendicular to the neutral line L1.

In the optical fiber cable 10, the side edge 3a of the reinforcing sheet 3 and the tension member 6 differ from each other in the position in the cable circumferential direction, and thus relative positions of the side edge 3a and the outer sheath 2 are not likely to fluctuate even when the cable main body 1 is bent. Accordingly, it is possible to avoid the damage of the outer sheath 2 due to the side edge 3a.

In one or more embodiments, the overlapping portion 13 and the tension member 6 differ from each other in the position in the cable circumferential direction. A position of the overlapping portion 13 and a position of the tension member 6 are made different from each other in the cable circumferential direction, and thus it is possible to reliably avoid the damage of the outer sheath 2 due to side edge 3a even when the cable main body 1 is bent.

In one or more embodiments, a difference between an outer diameter A1 of the cable main body 1 and an inner diameter A2 of the reinforcing sheet 3 is smaller than twice an outer diameter A3 of the rip cord 4. That is, the following Expression (1) is satisfied.

$$A2-A1<2A3 \quad (1)$$

Figure 5:
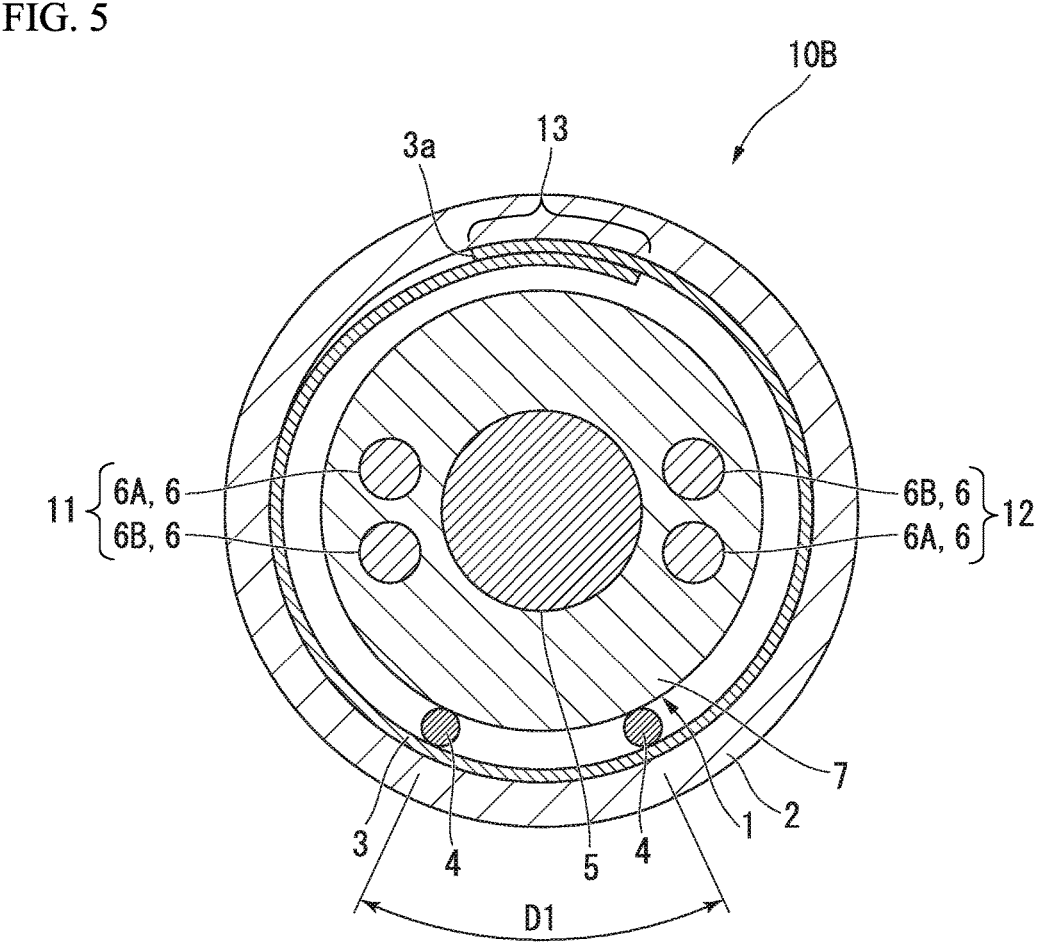
FIG. 5 is a cross-sectional view showing another example of the optical fiber cable according to one or more embodiments of the present invention.

As the difference between the outer diameter of the cable main body 1 and the inner diameter of the reinforcing sheet 3 becomes larger, a tendency to cause a positional deviation of the rip cord 4 becomes stronger (see FIG. 5). However, the difference between the outer diameter of the cable main body 1 and the inner diameter of the reinforcing sheet 3 is in the range (range in which Expression (1) mentioned above is satisfied), and thus it is possible to increase a frictional force of the rip cord 4 between the outer surface of the cable main body 1 and the inner surface of the reinforcing sheet 3. Accordingly, it is possible to reliably hold the rip cord 4 by the cable main body 1 and the reinforcing sheet 3 and to prevent a positional deviation in the cable circumferential direction of the rip cord 4.

The difference between the outer diameter A1 of the cable main body 1 and the inner diameter A2 of the reinforcing sheet 3 can be equal to or greater than 1.5 times the outer diameter A3 of the rip cord 4.

A cord formed of synthetic fiber, such as polyester or aramid, can be used as the rip cord 4. The rip cord 4 is required to have such a mechanical strength (for example, tensile strength) as to be capable of cutting off the reinforcing sheet 3 and the outer sheath 2. The outer diameter of the rip cord 4 may be, for example, 0.2 to 0.5 mm.

The rip cord 4 and the overlapping portion 13 differ from each other in the position in the cable circumferential direction.

Since the rip cord 4 and the overlapping portion 13 differ from each other in the position in the cable circumferential direction, the position in the cable circumferential direction of the rip cord 4 is a location where the reinforcing sheet 3 is a single layer. The location where the reinforcing sheet 3 is a single layer has a lower mechanical strength than that of the overlapping portion 13, and thus it is possible to reliably cut off the reinforcing sheet 3 by the rip cord 4.

Figure 4:
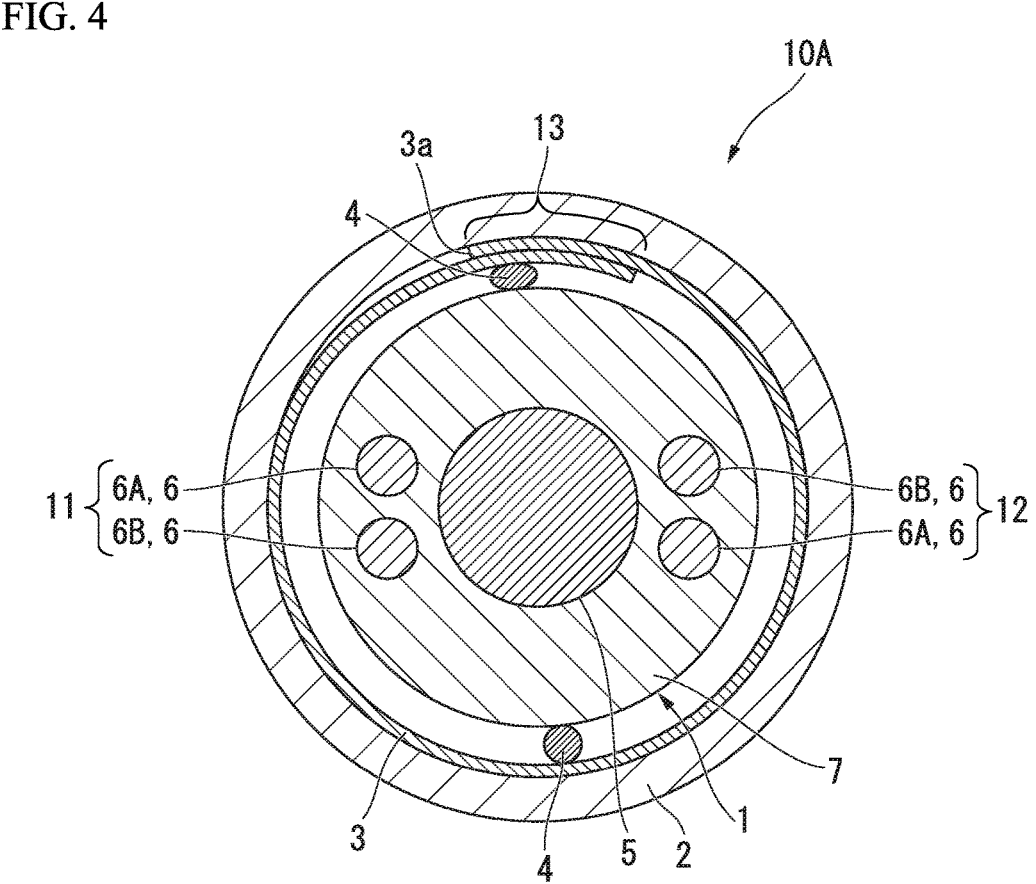
FIG. 4 is a cross-sectional view showing an example of the optical fiber cable according to one or more embodiments of the present invention.

On the other hand, in a case where the position of at least one rip cord 4 and the position of the overlapping portion 13 in the cable circumferential direction are consistent with each other as an optical fiber cable 10A shown in FIG. 4, it is not easy to cut off the overlapping portion 13 by the rip cord 4, which results in poor workability.

As shown in FIG. 1, the two rip cords 4, 4 are provided at positions facing each other with the cable main body 1 interposed therebetween. A difference in the position in the cable circumferential direction between the two rip cords 4, 4 is 120° or more. In other words, an angle between a third virtual line passing through the center of the cable main body 1 and the center of a first rip cord 4A in the pair of rip cords 4A and 4B and a fourth virtual line passing through the center of the cable main body 1 and the center of a second rip cord 4B in the pair of rip cords 4A and 4B is 120° or more. The difference in the position in the cable circumferential direction between the two rip cords 4, 4 (4A, 4B) is in the range (120° or more), and thus it is easy to take the cable main body 1 out of the divided outer sheath 2. In the optical fiber cable 10 shown in FIG. 1, the two rip cords 4, 4 are disposed at positions rotationally symmetrical to each other with the center axis C1 as the center thereof, and thus a difference in the position in the cable circumferential direction therebetween is 180°.

On the other hand, as in an optical fiber cable 10B shown in FIG. 5, as a difference D1 in the position in the cable circumferential direction between the two rip cords 4, 4 becomes smaller, the width of an open portion of the divided outer sheath 2 having a C-shaped cross-section becomes smaller, and thus it is not easy to take out a cable main body 1.

Note that the difference in the position in the cable circumferential direction between the two rip cords 4, 4 refers to a smaller angle in angles in the cable circumferential direction which are formed by the center axis of one rip cord 4 and the center axis of the other rip cord 4.

The following test was performed on the difference in the position in the cable circumferential direction between the two rip cords 4, 4.

The optical fiber cable 10 was manufactured in which the difference in the position in the cable circumferential direction between the two rip cords 4, 4 was values shown in Table 1.

An operation was performed of cutting off the reinforcing sheet 3 and the outer sheath 2 by the two rip cords 4, 4 and taking the cable main body 1 out of the divided outer sheath 2.

In this test, the take-out workability of the cable main body 1 was evaluated as any of A, B, and C. The "A" means that the workability is excellent. The "B" means that the cable main body 1 can be taken out, but it can be said that the workability is not excellent. The "C" means that the cable main body 1 cannot be taken out. The results are shown in Table 1.

TABLE 1

| Difference in position in cable circumferential direction between two rip cords (°) | Take-out workability |
|---|---|
| 30 | B |
| 60 | B |
| 90 | B |
| 120 | A |
| 150 | A |
| 180 | A |

According to Table 1, it can be understood that the take-out workability is improved by setting the difference in the position in the cable circumferential direction between the two rip cords 4, 4 to be 120° or more.

A pull-out force (pull-out force per meter of the length of the optical fiber cable 10) of the rip cord 4 is 300 gf or more (2.94 N or more). Note that 1 gf is approximately $9.81 \times 10^{-3}$ N.

The following text was performed on the pull-out force of the rip cord 4.

The optical fiber cable 10 was manufactured in which the pull-out force (pull-out force per meter of the length of the optical fiber cable 10) of the rip cord 4 was values shown in Table 2, by adjusting the outer diameter of the cable main body 1 or the inner diameter of the outer sheath 2, and a bending test and a twisting test were performed on the optical fiber cable 10. The pull-out force of the rip cord 4 was examined by a pull-out test (pull-out speed of 200 mm/min).

Figure 7:
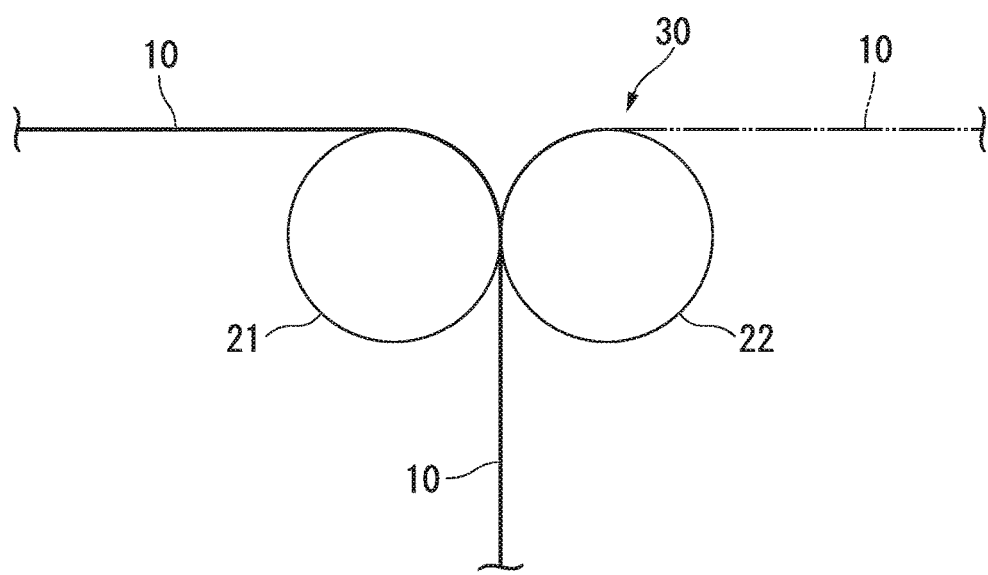
FIG. 7 is a schematic configuration diagram showing a bending test device.

A bending test device 30 shown in FIG. 7 was used for the bending test. The bending test device 30 includes two rollers 21 and 22 that are disposed in parallel.

The optical fiber cable 10 was in a state of being bent at +90° along the first roller 21 (solid line), and was then in a state of being bent at −90° along the second roller 22 (virtual line). In this manner, an operation of performing bending at ±90° was repeated in 25 cycles.

In the twisting test, the optical fiber cable 10 was twisted at +180° per meter of the length thereof, and was then twisted at −180°. In this manner, an operation of performing twisting at ±180° was repeated in 10 cycles.

The presence or absence of a positional deviation of the rip cord 4 was examined with respect to the optical fiber cable 10 having been subjected to the bending test and the twisting test. The results are shown in Table 2.

TABLE 2

| Pull-out force of rip cord (gf) | Positional deviation of rip cord |
|---|---|
| 100 | Present |
| 200 | Present |
| 300 | Absent |
| 500 | Absent |
| 1000 | Absent |
| 3000 | Absent |

As shown in Table 2, it was possible to prevent a positional deviation of the rip cord 4 by setting the pull-out force of the rip cord 4 to be 300 gf or more (2.94 N or more).

In one or more embodiments, the position of the rip cord 4 and the position of the tension member 6 in the cable circumferential direction are close to each other.

In FIG. 1, a center axis C4A of one rip cord (first rip cord) 4A in the pair of rip cords 4, 4 is positioned in the formation region 11a of the tension member 6 in the cable circumferential direction. Similarly, a center axis C4B of the other rip cord (second rip cord) 4B is positioned in the formation region 12a of the tension member 6 in the cable circumferential direction. For this reason, it can be understood that the position of the rip cord 4 and the position of the tension member 6 are close to each other in the cable circumferential direction.

The center axis of the rip cord 4 and the tension member 6 may differ from each other in the position in the cable circumferential direction, but a difference in the position in the cable circumferential direction between the center axis of the rip cord 4 and the tension member 6 is 30° or less.

When the optical fiber cable 10 shown in FIG. 1 is taken as an example, the difference in the position in the cable circumferential direction between the center axis C4A of the rip cord 4A and the formation region 11a is 30° or less. In other words, in one or more embodiments, one (tension member 6A1) of the tension members 6A is disposed in a region surrounded by a first virtual line passing through the center of the cable main body 1 and the center of the rip cord 4 (4A) and a second virtual line which is inclined at 30° or less with respect to the first virtual line and extends toward the outside in the radial direction, in the formation range 11a in the cable main body 1. Similarly, regarding the tension member 6B1, in one or more embodiments, one (tension member 6B1) of the tension members 6B is disposed in a region surrounded by the first virtual line passing through the center of the cable main body 1 and the center of the rip cord 4 (4A) and a second virtual line which is inclined at 30° or less with respect to the first virtual line and extends toward the outside in the radial direction, in the formation range 11a in the cable main body 1.

Similarly, a difference in the position in the cable circumferential direction between the center axis C4B of the rip cord 4B and the formation region 12a is 30° or less. In other words, in one or more embodiments, one (tension member 6B2) of the tension members 6B is disposed in a region surrounded by a first virtual line passing through the center of the cable main body 1 and the center of the rip cord 4 (4B) and a second virtual line which is inclined at 30° or less with respect to the first virtual line and extends toward the outside in the radial direction, in the formation range 12a in the cable main body 1. Similarly, regarding the tension member 6A2, in one or more embodiments, one (tension member 6A2) of the tension members 6A is disposed in a region surrounded by a first virtual line passing through the center of the cable main body 1 and the center of the rip cord 4 (4B) and a second virtual line which is inclined at 30° or less with respect to the first virtual line and extends toward the outside in the radial direction, in the formation range 12a within the cable main body 1.

The position of the rip cord 4 and the position of the tension member 6 in the cable circumferential direction are brought close to each other, and thus it is possible to align an open direction of the semi-cylindrical outer sheath 2, which is divided by the rip cord 4, and a direction in which the cable main body 1 tends to bend, when the cable main body 1 is taken out of the semi-cylindrical outer sheath 2.

Accordingly, it is easy to perform an operation of taking the cable main body 1 out of the outer sheath 2.

The outer sheath 2 is formed in a cylindrical body that accommodates the cable main body 1. As a material of the outer sheath 2, a resin such as polyethylene (PE) or polyvinyl chloride (PVC) can be used.

The inner diameter of the outer sheath 2 is larger than the outer diameter of the cable main body 1. In FIG. 1, the cross-section of the outer sheath 2 is formed to have a circular shape concentric with the cross-section of the cable main body 1.

As shown in FIG. 2, in one or more embodiments, the outer sheath 2 is formed to have a shape in which protrusions 2a extending in the circumferential direction and grooves 2b extending in the circumferential direction are alternately formed in the cable longitudinal direction, that is, a corrugated shape.

The outer sheath 2 is formed to have a corrugated shape, and thus it is possible to enhance the strength of the outer sheath 2 and to enhance a function of protecting the cable main body 1.

Note that a direction in which the protrusions 2a and the grooves 2b extend may not strictly be the circumferential direction of the outer sheath 2, or may be inclined with respect to the circumferential direction of the outer sheath 2.

When an intermediate post-branching operation is performed on the optical fiber cable 10, the reinforcing sheet 3 and the outer sheath 2 are cut off by the rip cord 4. The outer sheath 2 is divided into two parts by being cut off by the rip cord 4, and thus the outer sheath 2 has a semi-cylindrical shape.

The cable main body 1 is taken out of the outer sheath 2, and the inner sheath 7 is cut off using a rip cord (not shown) which is provided in the inner sheath 7 of the cable main body 1, thereby exposing the core 5.

The optical fiber 8 is partially cut out and is connected to an optical fiber provided in a branch destination.

In the optical fiber cable 10, the rip cord 4 and the overlapping portion 13 differ from each other in the position in the cable circumferential direction, and thus the position of the rip cord 4 in the cable circumferential direction is a location where the reinforcing sheet 3 is a single layer. For this reason, it is possible to reliably cut off the reinforcing sheet 3 by the rip cord 4. Accordingly, the workability of an operation of taking out the optical fibers 8 is improved because of intermediate post-branching or the like.

In addition, it is possible to reliably cut off the reinforcing sheet 3 by the rip cord 4, and thus it is not necessary to set a high strength (for example, tensile strength) of the rip cord 4. Accordingly, it is possible to achieve a reduction in cost.

The optical fiber cable 10 includes the reinforcing sheet 3 surrounding the cable main body 1, and thus it is possible to prevent the optical fibers 8 from being damaged due to feeding damage caused by animals.

The present invention is not limited to the above-described embodiments and can be appropriately modified without departing from the scope of the invention.

For example, in the optical fiber cable 10 shown in FIG. 1 and the like, four tension members 6 are used. However, the number of tension members is not particularly limited and can be applied in the scope in which the inventor is generally conceivable.

Figure 6:
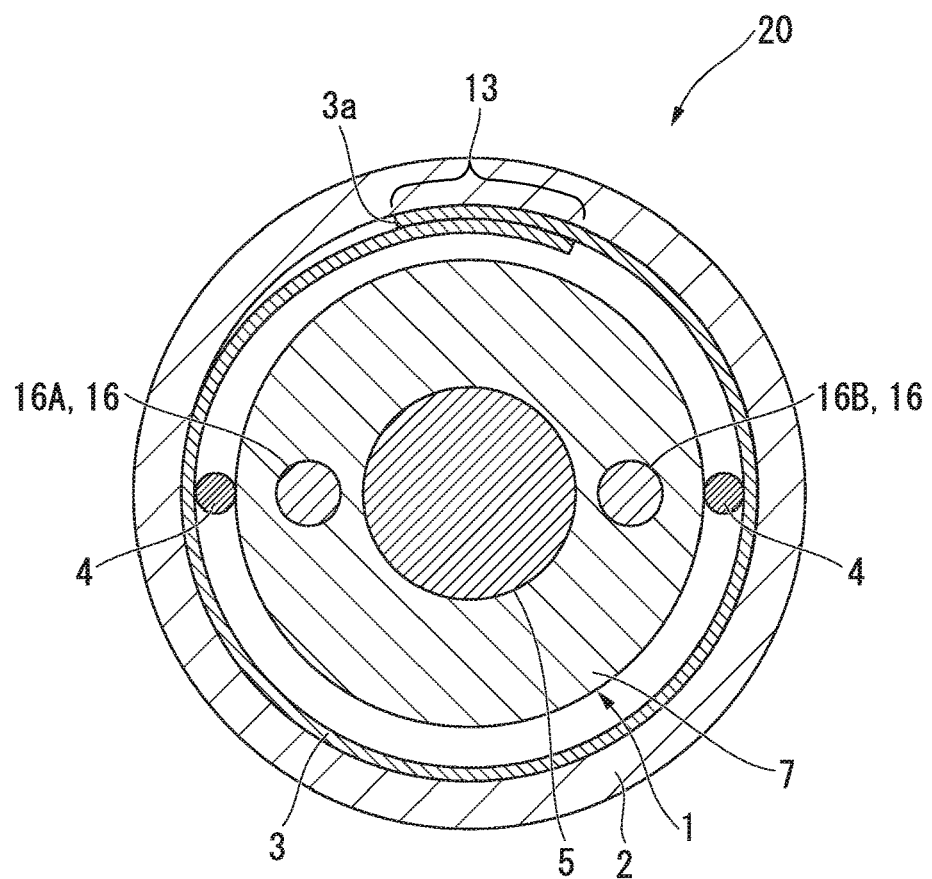
FIG. 6 is a cross-sectional view showing an optical fiber cable according to a second example of one or more embodiments of the present invention.

FIG. 6 is a cross-sectional view showing an optical fiber cable 20 according to a second example of one or more embodiments of the present invention. The optical fiber cable 20 has the same structure as that of the optical fiber cable 10 shown in FIG. 1 except that two tension members 16 (16A and 16B) facing each other with a core 5 interposed therebetween are used instead of the tension members 6. Note that the number of pair of tension members may be two or may be three or more.

In the optical fiber cable 10 shown in FIG. 1 and the like, the core 5 is an assembly of the optical fibers 8, but the core may be constituted by a single optical fiber (optical fiber core wire or the like).

1 Cable main body
2 Outer sheath
3 Reinforcing sheet
3a Side edge (side edge of reinforcing sheet on outer circumference side)
4 Rip cord
5 Core
6 Tension member
7 Inner sheath
8 Optical fiber
10, 20 Optical fiber cable
11 First tension member
12 Second tension member
13 Overlapping portion (portion overlapping reinforcing sheet)

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An optical fiber cable comprising:
   a cable main body comprising:
      a core including optical fibers,
      at least a pair of tension members that face each other with the core interposed therebetween, and
      an inner sheath that covers the core and the tension members;
   a cylindrical outer sheath that accommodates the cable main body;
   a reinforcing sheet provided between the cable main body and the outer sheath, wherein
      the reinforcing sheet surrounds an entire circumference of the cable main body,
      the reinforcing sheet includes an overlapping portion in which portions of the reinforcing sheet overlap each other in a portion in a circumferential direction of the cable main body, and
      the reinforcing sheet is formed of a metal; and
   a rip cord provided between the reinforcing sheet and the cable main body,
   wherein the overlapping portion of the reinforcing sheet and the rip cord are provided at different positions in the circumferential direction of the cable main body.

2. The optical fiber cable according to claim 1, wherein a side edge of the reinforcing sheet disposed on an outer circumference in the overlapping portion of the reinforcing sheet and the tension members are provided at different positions in the circumferential direction of the cable main body.

3. The optical fiber cable according to claim 1, wherein the overlapping portion of the reinforcing sheet and the tension members are provided at different positions in the circumferential direction of the cable main body.

4. The optical fiber cable according to claim 1, wherein one of the tension members is disposed within a region surrounded by a first virtual line passing through a center of the cable main body and a center of the rip cord and a second virtual line that is inclined at 30° or less with respect to the first virtual line and extends toward an outside in a radial direction, in the cable main body.

5. The optical fiber cable according to claim 1, further comprising:
   a pair of rip cords,
   wherein an angle between a third virtual line passing through a center of the cable main body and a center of a first rip cord in the pair of rip cords and a fourth virtual line passing through the center of the cable main body and a center of a second rip cord in the pair of rip cords is at least 120°.

6. The optical fiber cable according to claim 4, further comprising:
   a pair of rip cords,
   wherein an angle between a third virtual line passing through the center of the cable main body and a center of a first rip cord in the pair of rip cords and a fourth virtual line passing through the center of the cable main body and a center of a second rip cord in the pair of rip cords is at least 120°.

7. The optical fiber cable according to claim 1, wherein a difference between an outer diameter of the cable main body and an inner diameter of the reinforcing sheet is smaller than twice an outer diameter of the rip cord.

8. The optical fiber cable according to claim 1, wherein a pull-out force of the rip cord is at least 2.94 N.

9. The optical fiber cable according to claim 1, wherein the outer sheath has a corrugated shape.

10. The optical fiber cable according to claim 1, wherein the rip cord is disposed outside of the tension members in a radial direction of the optical fiber.

* * * * *